United States Patent
Benco et al.

(10) Patent No.: US 6,940,960 B2
(45) Date of Patent: Sep. 6, 2005

(54) SELECTIVE CONFERENCE CALL DISCONNECT

(75) Inventors: David S. Benco, Winfield, IL (US); Daisy Diaz, Miami, FL (US); Ronald Bruce Martin, Carol Stream, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 160 days.

(21) Appl. No.: 10/376,161

(22) Filed: Feb. 27, 2003

(65) Prior Publication Data

US 2004/0170264 A1 Sep. 2, 2004

(51) Int. Cl.[7] .................................................. H04M 3/42

(52) U.S. Cl. .............................. 379/202.01; 379/205.01

(58) Field of Search ....................... 379/202.01, 205.01

(56) References Cited

U.S. PATENT DOCUMENTS 158,900 A * 1/1875 Santos ......................... 709/205

* cited by examiner

*Primary Examiner*—Creighton Smith

(57) ABSTRACT

Participants on a conference call are managed by terminating incoming calls at a conference bridge and storing a record for each call entering the conference call, each record including identification of the caller and a corresponding port number of the conference bridge assigned to the call. A list of all callers currently connected to the conference call is maintained. Upon receiving a request from an administrative host of the conference call, the list of current conference call participants is communicated to the host. Upon receipt of a disconnect request from the host identifying a first record associated with a first conference call participant to be disconnected, the first record a corresponding first port number is located, and the call associated with the first port number is disconnected.

10 Claims, 2 Drawing Sheets

SELECTIVE CONFERENCE CALL DISCONNECT

BACKGROUND

This invention is generally directed to the conferencing of telephone calls in a telecommunications system, and is more specifically directed to managing participation in the conference call such as controlling which participants can remain in the conference call.

Conference calls are supported in a variety of ways. A 3-way conferencing function can be performed by most modern telecommunication switches, e.g. the 5ESS® switch by Lucent Technologies Inc. Such 3-way conferencing typically provides the host, the party joining the third party to the conference call, with the ability to disconnect the last added party while retaining the connection with the other party. Conference call bridges that can support many participants are available from several manufacturers. These bridges are connected to a telecommunications switch and serve as an adjunct capable of terminating a plurality of incoming telephone calls. After dialing a predetermined telephone number to reach the conference bridge, participants typically enter a conference code associated with a specific conference. The party arranging the conference call may seek to allow only authorized participants by having an operator associated with the conference call service intercept each party attempting to join the conference call and obtain information from each caller to validate that the caller is authorized to participate in the conference call. Once a party is added to a multiparty conference call, the host is not able to positively determine if a particular party has disconnected from the conference and is not able to disconnect a particular party from the conference call while maintaining the conference call for the other parties. Of course the host can ask a particular party to voluntarily drop off the conference call, but cannot be sure that the particular party has actually dropped off of the conference call.

After discussing a subject with a group of people on a conference call, it would often be convenient to further discuss more sensitive matters relating to the subject with a subset of the participants. For example, a variety of projects may be discussed in a conference call with people involved with each of the projects and management responsible for all of the projects. Where management decisions such as discontinuing some of the projects must be made, it would be convenient to continue the conference call if the only remaining participants were limited to management and the leader of each project. However, it is not possible to ensure that only the desired subset of the original larger conference group remain on the conference call.

There exists a need for an improved conference call capability to permit a host to positively manage which participants remain on a conference call.

SUMMARY OF THE INVENTION

It is an object of the present invention to provide a solution for this need.

In accord with an embodiment of the present invention, participants on a conference call are managed by terminating incoming calls at a conference bridge and storing a record for each call entering the conference call, each record including identification of the caller and a corresponding port number of the conference bridge assigned to the call. A list of all callers currently connected to the conference call is maintained. Upon receiving a request from an administrative host of the conference call, the list of current conference call participants is communicated to the host.

In a further aspect of the present invention, upon receipt of a disconnect request from the host identifying a first record associated with a first conference call participant to be disconnected, the first record having a corresponding first port number, and the call associated with the first port number is disconnected.

An improved conference bridge for practicing the management of participants to the conference call is a further embodiment of the present invention.

DETAILED DESCRIPTION OF THE PREFERRED EMBODIMENTS

Figure 1:
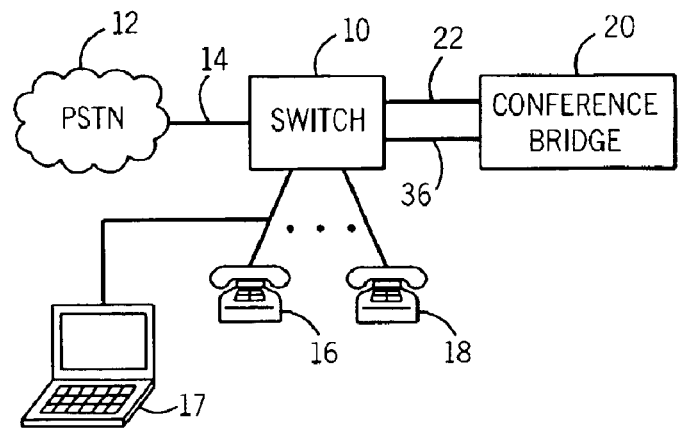
FIG. 1 is a block diagram of a telecommunications system incorporating a conference bridge in accordance with the present invention.

FIG. 1 illustrates a telecommunications system including a telecommunications switch 10, e.g. a class five switch, that is connected to the public switched telephone network (PSTN) 12 by one or more communication channels 14. Exemplary telephone sets 16 and 18 are connected to the switch 10 by corresponding telephone lines. In this example, the user associated with telephone set 16 also utilizes a terminal device 17, such as a personal computer, for data communications. A conference bridge 20 is connected to switch 10 by communication channel 22. Depending upon the number of participants that can be simultaneously terminated by the conference bridge 20, channel 22 may consist of a plurality of telephone lines that each carry only one call or may consist of one or more trunk lines each capable of carrying a plurality of simultaneous telephone calls. As will be apparent to those skilled in the art, any telephone set connected to switch 10 or that can be coupled through the PSTN 12 to switch 10 is capable of being a participant in a conference call supported by conference bridge 20. For purposes of clarity FIG. 1 illustrates voice path channels, and does not illustrate the use of a known command and control signaling network, e.g. an SS7 network, except to show channel 36 that carries command and control signals between switch 10 and the conference bridge 20.

Figure 2:
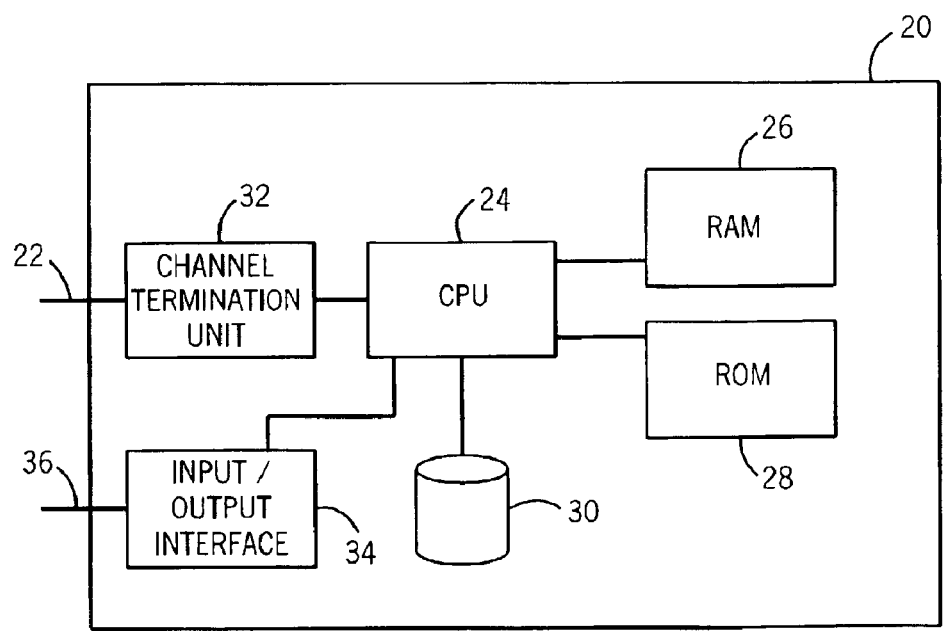
FIG. 2 is a block diagram of an exemplary conference bridge in accordance with the present invention.

FIG. 2 is a block diagram of an exemplary conference bridge 20 in accordance with the present invention. A central processing unit, e.g. a microprocessor, 24 is coupled to and supported by random access memory (RAM) 26, read-only memory (ROM) 28, and a nonvolatile storage device 30 such as a disk drive. A channel termination unit 32 operates under the control of CPU 24 and terminates incoming calls over channel 22. In addition to being able to terminate incoming calls, channel termination unit 32 can conference or combine incoming calls to form one or more conference calls based on directions provided by CPU 24. An input/output interface 34 is coupled to CPU 24 and enables the conference bridge 20 to receive and transmit command and control signals by channel 36 with switch 10 and the telecommunication signaling network (not shown). The CPU 24 operates under stored program control instructions and enables the conference bridge 20 to provide call conferencing functions including enhanced management capabilities described below.

Figure 3:
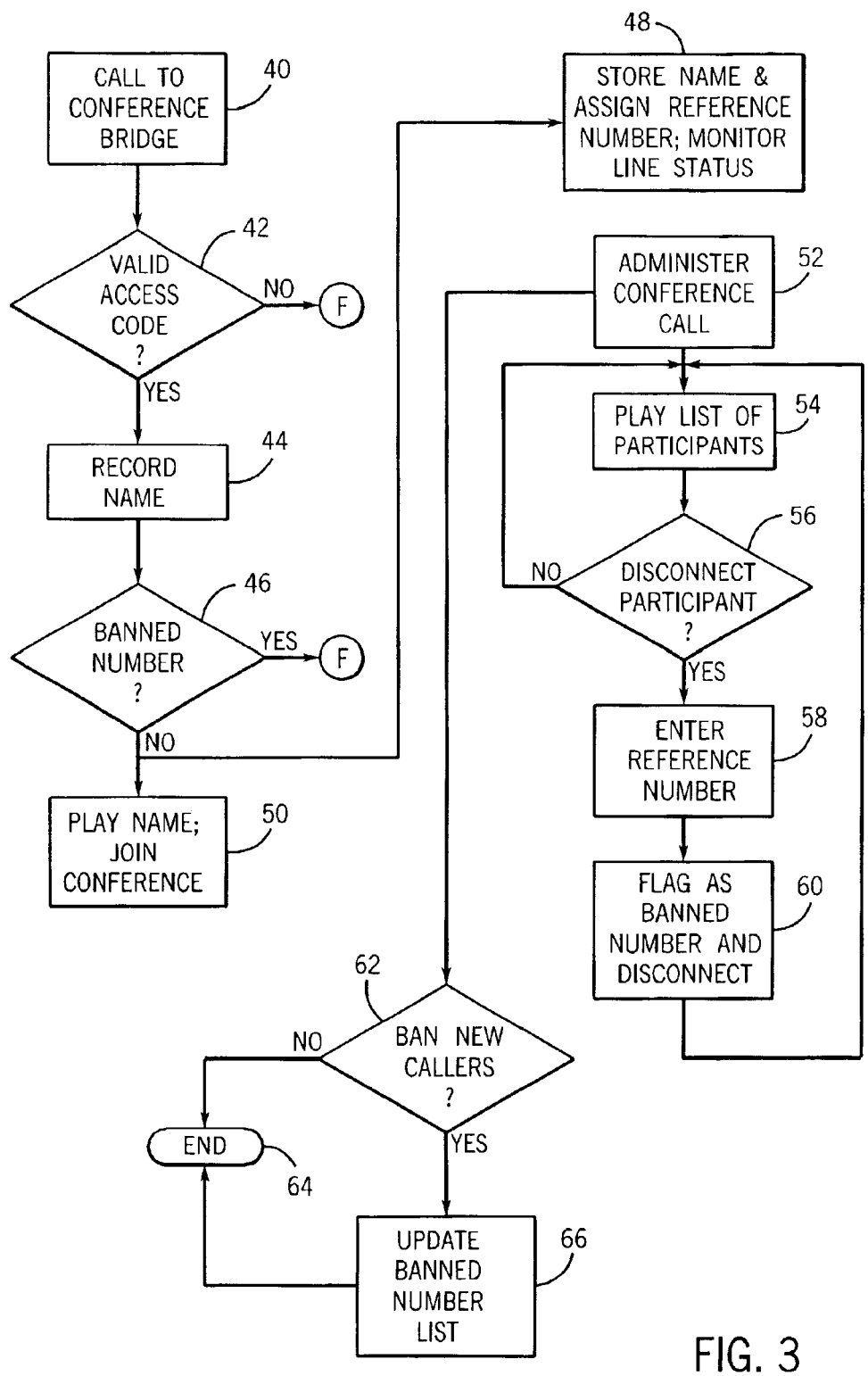
FIG. 3 is a flow diagram illustrating an exemplary method for providing improved conference call management of participants in accordance with the present invention.

FIG. 3 is a flow diagram of an exemplary method for providing a host with improved management capabilities of conference call participants, including but not limited to, positively determining which participants remain on the conference call. Prior to the scheduled time for the beginning of the conference call, a host or administrator desiring to set up a conference call will have made arrangements to schedule a particular conference call. The arrangements will typically include the host specifying the number of participants or at least a maximum number of permitted participants, and a duration or maximum duration of the conference call. These arrangements can be communicated by a voice call from the host to a conference bridge operator who will enter the appropriate information in the conference bridge. Alternatively, the arrangements can be directly input into the conference bridge by the host such as by an Internet supported web site operated by the conference bridge service provider.

Beginning in step 40, an incoming call is received from a caller seeking to participate in a conference call and is terminated by the conference bridge from switch 10. A determination is made by step 42 of whether the caller has input a valid conference code. The host upon scheduling the conference call will have been assigned a conference code, e.g. a several digit number, by the conference bridge service provider. It is normally the duty of the host to properly distribute the assigned conference code to the desired participants. As is known in the art, an audible prompt can be played to the caller requesting the caller to input the conference code by DTMF tones. A NO determination by step 42 results in a failure (F) that terminates the attempt by the caller to gain access to the conference call. As will be known to those skilled in the art, a decision step may permit the caller one or more additional opportunities to enter a correct response before reaching a final failure determination.

A YES determination by step 42, indicating that a valid conference code has been entered, is followed by step 44 in which the caller's name is recorded. Although not required, a prompt is preferred to be played to the caller requesting the caller to speak his name. Alternatively, a caller could be requested to enter his name using a DTMF tone sequence, or if data communications are available to the caller, the caller could utilize a data terminal to transmit his name as a text message. In step 46 a determination is made of whether the caller is calling from a banned telephone number. The telephone number of the caller can be determined from the calling line identification information (CLID). As will be explained in more detail below, a list of banned numbers is maintained under the control of the host. The caller's telephone number is checked against this list. A YES determination by step 46, indicating that the caller's telephone number is on the banned list, results in a failure (F) and termination of the associated call. A NO determination by step 46 results in the caller's recorded name being stored in a record in a database associated with the subject conference call in step 48. The database and the storage of records are preferably integrated as part of the conference bridge. The record is assigned a reference number to identify the specific record. The record also contains the port number of the conference bridge associated with the call and preferably contains the telephone number of the caller. As used herein port number refers either to a physical port or a time slot on which the call resides. Step 48 also monitors the status of the caller's line, that is, determines whether the caller remains connected to the conference bridge. The line status of each caller can be independently determined by the conference bridge or received as information from switch 10. A NO determination by step 46 also results in the call being joined to the telephone conference and the recorded name of the caller being played as an announcement to the existing conference call participants to identify the new person entering the conference in step 50. This process is completed for each caller attempting to become a participant in the conference call.

In step 52 administration of the conference call is undertaken by a previously authorized party, e.g. the host. Preferably, the host will have established a communication line with the conference bridge that is not conferenced with the conference call participants. During the scheduling of the conference call, the host may have been provided with a separate telephone number and an administration authorization code to access the conference bridge for administration purposes. Alternatively, the host may call the normal conference call number and enter a special authorization code that will cause the call to be maintained independently and not joined with the other conference callers. Typically, the host will also participate in the conference call using another telephone line. In this example, assume that a conference call with 25 participants is in progress and that it is now desired to continue the conference call but with only 5 of the original 25 participants. Preferably an announcement will be made, typically by the host, to the 25 conference call participants indicating that all the participants except for 5 named participants should disconnect from the conference call at this time.

After a short delay to give participants a chance to disconnect from the conference call, the host may announce on the conference call that there will be a momentary delay while the host confirms that only the specific 5 participants remain on the conference call. The host then proceeds in step 54 using the separate administration line to enter a command causing the conference bridge to play back a list of current conference call participants. Because the conference bridge monitors the line status of the participants, those previously participating who have disconnected from the conference call will not be on the playback list. Each current participant's name and associated reference number will be sequentially communicated to the host on the administration line.

In step 56 the host makes a determination as the names and reference numbers are played back of whether a participant should be disconnected. A NO determination by step 56 for a given participant, results in a continuation of the playing of the names and reference numbers of the remaining participants. A YES determination at step 56 as determined by the host results in the host entering the corresponding reference number associated with the name of the participant to be disconnected at step 58. DTMF tones corresponding to the digits of the reference number are entered by the host on the administration line. Upon the conference bridge receiving the number associated with a record of the participant to be disconnected, the conference bridge updates the corresponding record by entering a flag denoting the record as a banned number and causes disconnection of the line associated with the port number stored in the record.

Following the disconnection process of a participant in step 60, during which the playback of the list of participants was automatically paused, the playback of the participant list continues until all participants have been identified. Following the playback of the identification of the last participant in the list, the host is preferably prompted for instructions to either discontinue the playing back of participants or to start over again playing back to list. After having reviewed the list and disconnecting those that are not to participate in the remainder of the conference, the host can be positive that no callers (no telephone line connections) remain that are not intended.

In a preferred embodiment, the host will also be given the opportunity to ban the addition of any new callers, regardless of any previous authorizations that may have been granted, in determination step 62. The host using the administration line can issue a predetermined DTMF command, or respond to a prompt generated by the conference bridge, to ban any additional callers to the subject conference call. This feature adds a further level of control and security especially when only a subgroup of an original larger group of conference participants are to remain in the conference for the purpose of discussing sensitive or restricted information. A NO determination at step 62 terminates this election by the host at END 64. A YES determination at step 62, as determined by an instruction received from the host by the conference bridge on the administration line, causes the conference bridge to update the banned number list with a predetermined entry representative that all calls are banned. Thus, any new callers attempting to join the conference call will be rejected at step 46 since all further calls will now be banned. Following step 66 this feature terminates at END 64.

In the preceding exemplary method, communications between the conference bridge and the host over the administrative line were by audible prompts provided by the conference bridge and DTMF tone instructions input by the host using a conventional telephone set. In a further embodiment of the present invention, data communications are utilized between the conference bridge and the host. For example, the host can utilize a terminal, such as a personal computer, to communicate with the conference bridge over a separate administrative line, a separate data channel associated with a voice line such as available with ISDN service, or by a data communication network such as the Internet. In this embodiment the list of participants connected to the conference call is displayed as a table on the host's screen. Where there will be a large number of participants to the conference call, it will be more convenient for the host to utilize data communications rather than listening to a sequential audible play back of the list. Utilizing data communications will enable the host to quickly scan a list displayed on the host's screen and allow the host to easily indicate the participants (records) to be disconnected by inputting the corresponding reference numbers by keyboard entry or highlighting the corresponding participants (records) on the host's screen.

Another aspect of the above embodiments of the present invention resides in the communication of the list of current conference call participants to the host. The knowledge by the participants that the host can positively ascertain who is on the conference call will likely inhibit participants not intended to remain on a conference call from attempting to remain on the call.

Although embodiments of the invention have been described above and shown in the drawings, the scope of the invention is defined by the claims that follow. The description of the embodiments and methods are exemplary and are not to be considered as limiting.

We claim:
1. A method for managing participants permitted to remain on a conference call comprising the steps of:
    terminating incoming calls at a conference bridge;
    storing a record for each call entering the conference call, each record including identification of the caller and a corresponding port number of the conference bridge assigned to the call;
    maintaining a list at the conference bridge of all callers currently connected to the conference call;
    upon receiving a list request at the conference bridge from an administrative host of the conference call, communicating the list of current conference call participants to the host;
    upon receipt of a disconnect request at the conference bridge from the host identifying a first record associated with a first conference call participant to be disconnected, determining from the first record a corresponding first port number;
    disconnecting the call associated with the first port number.
2. The method according to claim 1 further comprising the step of inserting the telephone number of the caller associated with the first record onto a banned number list associated with the conference call.
3. A method for managing participants permitted to remain on a conference call comprising the steps of:
    terminating incoming calls at a conference bridge;
    storing a record for each call entering the conference call, each record including identification of the caller and a corresponding port number of the conference bridge assigned to the call;
    maintaining a list at the conference bridge of all callers currently connected to the conference call;
    upon receiving a list request at the conference bridge from an administrative host of the conference call, communicating the list of current conference call participants to the host;
    preventing any additional callers from joining the conference call upon receipt of a predetermined command at the conference bridge from the administrative host.
4. The method according to claim 3 wherein the preventing step prevents any additional callers from joining the conference call regardless of any previous authorizations that may have been granted to a caller to enter the conference call.
5. A method for managing participants permitted to remain on a conference call comprising the steps of;
    terminating incoming calls at a conference bridge;
    storing a record for each call entering the conference call, each record including identification of the caller and a corresponding port number of the conference bridge assigned to the call;
    maintaining a list at the conference bridge of all callers currently connected to the conference call;
    upon receiving a list request at the conference bridge from an administrative host of the conference call, communicating the list of current conference call participants to the host;
    storing a banned number list containing telephone numbers that are not to be allowed to join the conference call, and denying access to the conference call if the telephone number of the caller is on the banned number list.

6. A conference bridge that facilitates the managing of participants permitted to remain on a conference call comprising:

means for terminating incoming calls at a conference bridge;

means for storing a record for each call entering the conference call, each record including identification of the caller and a corresponding port number of the conference bridge assigned to the call;

means for maintaining a list at the conference bridge of all callers currently connected to the conference call;

means for communicating the list of current conference call participants to the host upon receipt of a list request at the conference bridge from an administrative host of the conference call;

means for determining a first port number contained in a first record upon receipt of a disconnect request at the conference bridge from the host, the disconnect request identifying the first record associated with a first conference call participant to be disconnected;

means for disconnecting the call associated with the first port number.

7. The conference bridge according to claim 6 further comprising means for inserting the telephone number of the caller associated with the first record onto a banned number list associated with the conference call.

8. A conference bridge that facilitates the managing of participants permitted to remain on a conference call comprising:

means for terminating incoming calls at a conference bridge;

means for storing a record for each call entering the conference call, each record including identification of the caller and a corresponding port number of the conference bridge assigned to the call;

means for maintaining a list at the conference bridge of all callers currently connected to the conference call;

means for communicating the list of current conference call participants to the host upon receipt of a list request at the conference bridge from an administrative host of the conference call;

means for preventing any additional callers from joining the conference call upon receipt of a predetermined command at the conference bridge from the administrative host.

9. The conference bridge according to claim 8 wherein the means for preventing prevents any additional callers from joining the conference call regardless of any previous authorizations that may have been granted to a caller to enter the conference call.

10. A conference bridge that facilitates the managing of participants permitted to remain on a conference call comprising:

means for terminating incoming calls at a conference bridge;

means for storing a record for each call entering the conference call, each record including identification of the caller and a corresponding port number of the conference bridge assigned to the call;

means for maintaining a list at the conference bridge of all callers currently connected to the conference call;

means for communicating the list of current conference call participants to the host upon receipt of a list request at the conference bridge from an administrative host of the conference call;

means for storing a banned number list containing telephone numbers that are not to be allowed to join the conference call, and means for denying access to the conference call if the telephone number of the caller is on the banned number list.

* * * * *